J. TEMPLE.
Car Brake.
No. 55,964. Patented June 26, 1866.
2 Sheets—Sheet 1.
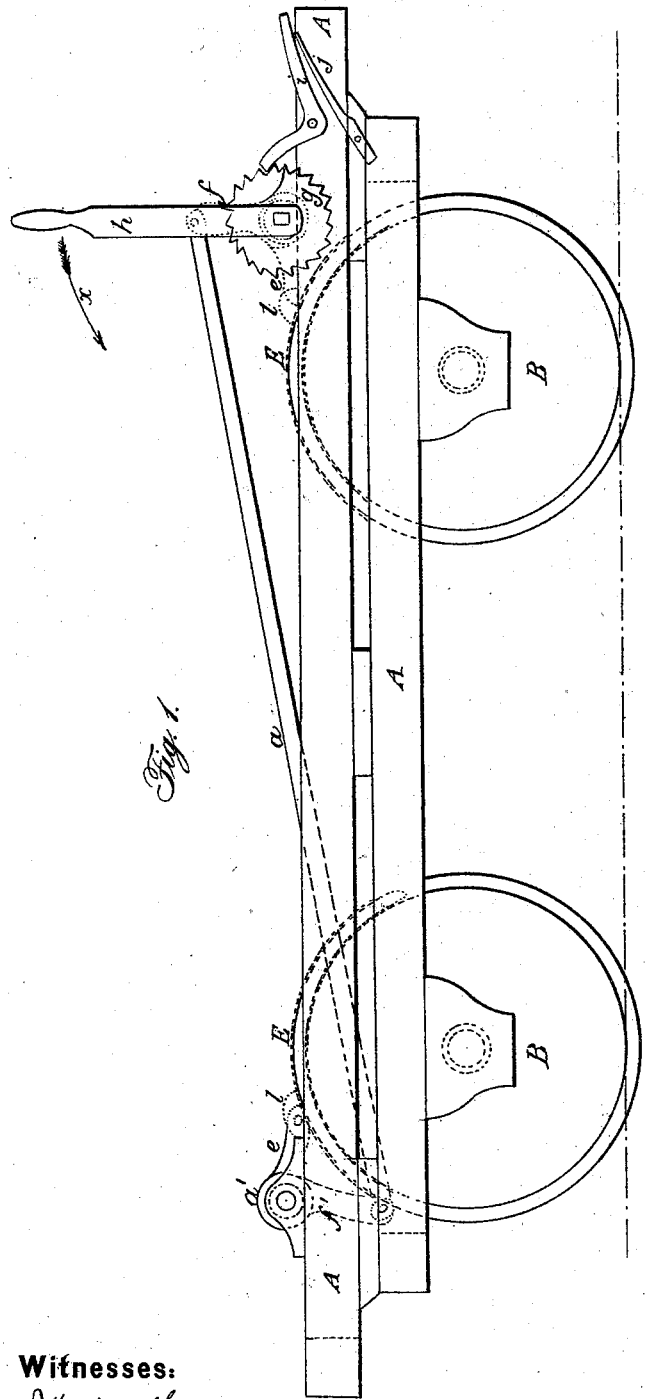
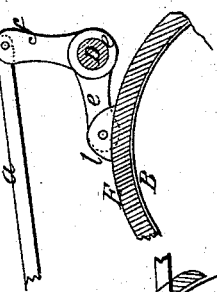
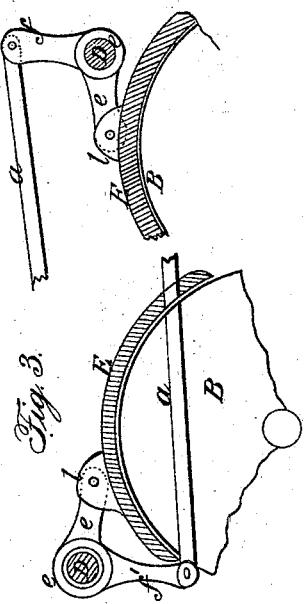
Witnesses:
Theodore Long
Jon. Johnson
Inventor:
James Temple
by his Attorney
S. S. Fahnestock

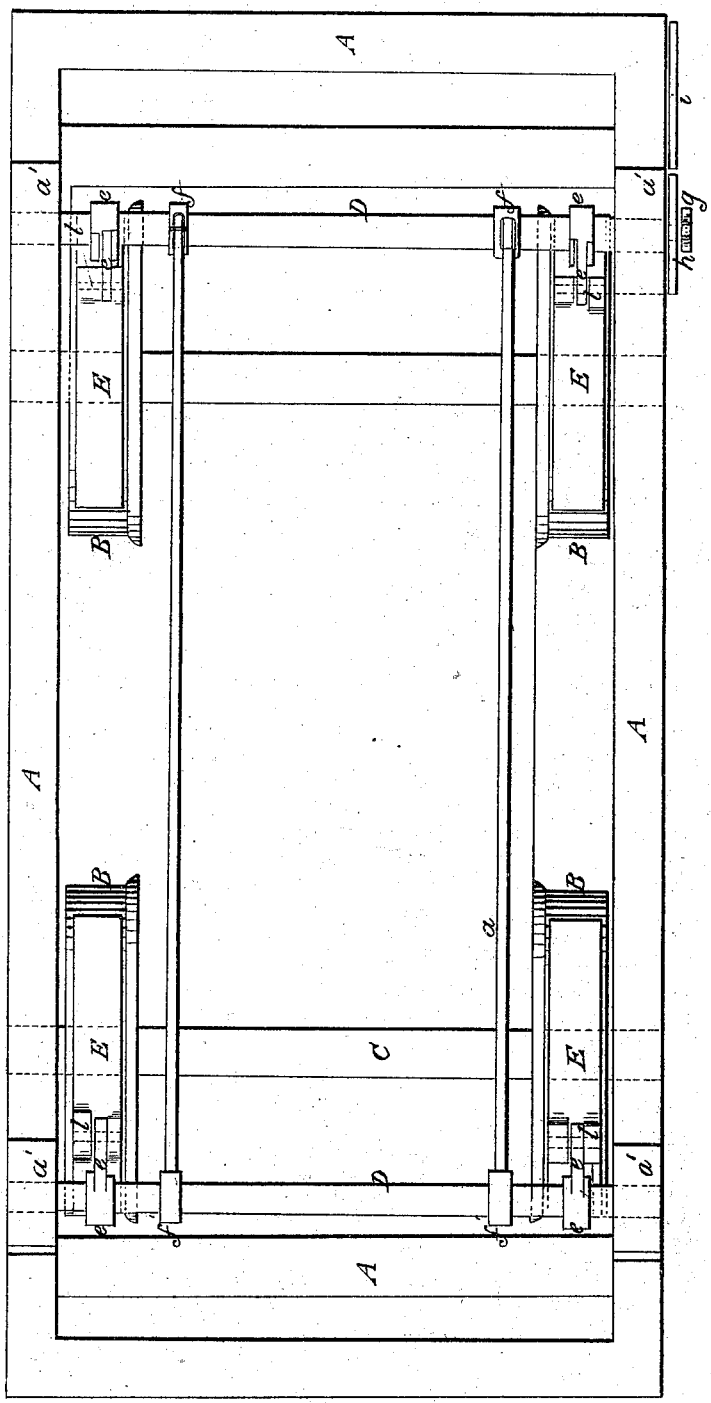

UNITED STATES PATENT OFFICE.

JAMES TEMPLE, OF SELIN'S GROVE, PENNSYLVANIA, ASSIGNOR TO HIMSELF, JOHN SCHOCK, AND H. E. MILLER.

IMPROVEMENT IN CAR-BRAKES.

Specification forming part of Letters Patent No. 55,964, dated June 26, 1866.

*To all whom it may concern:*

Be it known that I, JAMES TEMPLE, of the town of Selin's Grove, county of Snyder, in the State of Pennsylvania, have invented a new and Improved Car-Brake; and I do hereby declare that the following is a full and exact description thereof, reference being had to the accompanying drawings, and to the letters of reference marked thereon.

The nature of my invention consists of a very simple and effective method of operating the brakes by means of a lever and two rock-shafts having connecting-rods, &c.

To enable others skilled in the art to make and use my invention, I will proceed to describe its construction and operation.

In the several drawings or figures like parts are indicated by like figures.

Figure 1 represents a side view of a truck or frame supported by four wheels; Fig. 2, a top or plan view of the same; Figs. 3 and 4, partial details of what is shown on the other figures.

A represents the frame proper, B the wheels, C their axles, all constructed, it may be said, as usual.

To apply effectively and easily the brakes or rubbers to the wheels, I use two rock-shafts, D D, having arms $f f'$, which are connected by rods $a a$. These arms are, in their normal position, nearly vertical, one above and the other below their respective rock-shafts, and are properly secured thereto by wedges, set-screws, or in any other well-known manner. On each of these shafts are two other arms, $e e$, properly secured, and these are pivoted or hinged to projections $l$ on the rubbers E, so as to lift the same or bear them down on the wheels B. Connected with one of the rock-shafts is a ratchet-wheel, $g$, and lever $h$, the former working in connection with a spring pawl or dog, $i$. $j$ is a spring pressing upon it, keeping it in contact with wheel.

The rubbers may be made to cover as much of the rim of the wheel as may be desirable. The rods $a a$ are pivoted to the end of arms $f f'$.

The operation is as follows: By bearing on lever $h$, pulling or pushing it in the direction of arrow $x$, all the brakes or rubbers are put on or down, creating friction and lessening the speed if under way. By the reverse movement the rubbers are raised or the wheels relieved. When brakes are down the spring-dog $i$, catching under the teeth of ratchet-wheel $g$, assists in maintaining the pressure on wheels, relieving, as usual, the brakeman. Touching the other end of dog and bearing down relieves the wheels from the pressure of the rubbers.

The brakeman may operate from the inside of a car, and the device may be extended so as to embrace more than one truck.

Having thus described my invention, what I claim as new, and desire to secure by Letters Patent of the United States, is—

The combination of the rock-shafts D, arms $f f'$, and rods $a$ with the arms $e$ and rubbers E, operated by the lever $h$, and arranged as described, for the purpose set forth.

JAMES TEMPLE.

Witnesses:
 S. S. FAHNESTOCK,
 EDM. F. BROWN.